United States Patent
Murphy et al.

(10) Patent No.: US 10,352,481 B2
(45) Date of Patent: Jul. 16, 2019

(54) ELECTRORHEOLOGICAL VALVE

(71) Applicant: Boston Dynamics, Inc., Waltham, MA (US)

(72) Inventors: Michael Murphy, Arlington, MA (US); Robert Playter, Mountain View, CA (US)

(73) Assignee: Boston Dynamics, Inc., Waltham, MA (US)

( * ) Notice: Subject to any disclaimer, the term of this patent is extended or adjusted under 35 U.S.C. 154(b) by 37 days.

(21) Appl. No.: 15/444,975

(22) Filed: Feb. 28, 2017

(65) Prior Publication Data

US 2017/0167634 A1    Jun. 15, 2017

Related U.S. Application Data

(63) Continuation of application No. 14/618,670, filed on Feb. 10, 2015, now abandoned, which is a continuation of application No. 13/066,909, filed on Apr. 27, 2011, now Pat. No. 8,973,613.

(51) Int. Cl.
| | |
|---|---|
| *F15C 1/04* | (2006.01) |
| *F16K 99/00* | (2006.01) |
| *F15B 21/06* | (2006.01) |
| *F16K 13/10* | (2006.01) |

(Continued)

(52) U.S. Cl.
CPC ........ *F16K 99/0021* (2013.01); *F15B 21/065* (2013.01); *F16K 13/10* (2013.01); *F16K 31/02* (2013.01); *F16K 99/0051* (2013.01); *G05D 7/0617* (2013.01); *Y10S 137/909* (2013.01); *Y10T 137/0391* (2015.04); *Y10T 137/2082* (2015.04); *Y10T 137/218* (2015.04); *Y10T 137/2191* (2015.04); *Y10T 137/87249* (2015.04)

(58) Field of Classification Search
CPC .. F16K 99/0021; F16K 99/0051; F16K 13/10; F16K 31/02; F15C 1/04; G05D 7/0617; F15B 21/065; Y10T 137/2191; Y10T 137/87249; Y10T 137/0391; Y10T 137/2082; Y10T 137/218
USPC ........ 137/827, 807, 909, 625; 204/450, 600, 204/554
See application file for complete search history.

(56) References Cited

U.S. PATENT DOCUMENTS 3,405,728 A * 10/1968 Dexter ............... F16K 31/02
137/251.1
3,416,549 A * 12/1968 Chaney ............... F15B 21/065
137/807

(Continued)

*Primary Examiner* — Minh Q Le
(74) *Attorney, Agent, or Firm* — Honigman LLP

(57) ABSTRACT

An ER fluid valve includes a housing and a plurality of parallel flow passages through the housing each defined by spaced electrodes at least one of which is controllable independently of other flow passages electrodes. A controller is configured to selectively establish electrical fields for all of the independently controllable electrodes to close all of the flow passages to ER fluid flowing through the housing. By removing the fields from all of the independently controllable electrodes, all the flow passages are open to the ER fluid flowing through the housing. By establishing fields for select independently controllable electrodes to close their associated flow passages and by leaving other flow passages open, restricted flow of the ER fluid through the housing is accomplished to vary the flow rate through the housing.

19 Claims, 8 Drawing Sheets

(51) Int. Cl.
*F16K 31/02* (2006.01)
*G05D 7/06* (2006.01)

(56) References Cited

U.S. PATENT DOCUMENTS

| | | | | |
|---|---|---|---|---|
| 3,552,275 | A * | 1/1971 | Chaney | C10M 171/001 137/251.1 |
| 3,599,428 | A * | 8/1971 | Chaney | F15B 21/065 137/251.1 |
| 3,744,376 | A * | 7/1973 | Carpenter | F15B 13/06 137/12 |
| 4,923,057 | A * | 5/1990 | Carlson | E04B 1/98 188/267.1 |
| 5,099,884 | A * | 3/1992 | Monahan | F01L 1/46 123/90.11 |
| 5,241,991 | A * | 9/1993 | Iorio | G05D 7/0635 137/251.1 |
| 5,267,633 | A * | 12/1993 | Endo | F16F 15/03 188/267.1 |
| 5,810,126 | A * | 9/1998 | Kordonsky | B32B 33/00 188/267 |
| 6,048,050 | A * | 4/2000 | Gundlach | B41J 2/06 347/46 |
| 6,240,944 | B1 * | 6/2001 | Ohnstein | F16K 99/0051 137/1 |
| 6,382,254 | B1 * | 5/2002 | Yang | A61M 5/16881 137/341 |
| 7,328,882 | B2 * | 2/2008 | Wang | F15C 5/00 251/129.01 |
| 7,597,855 | B2 * | 10/2009 | Trentacosta | B01D 39/1692 2/457 |
| 7,665,715 | B2 * | 2/2010 | Peeters | F16K 13/10 251/129.01 |
| 8,272,392 | B2 * | 9/2012 | Pattekar | B01L 3/502738 137/1 |
| 2003/0226604 | A1 * | 12/2003 | Schlautmann | B01L 3/502707 137/827 |
| 2004/0234401 | A1 * | 11/2004 | Banister | F04B 43/043 417/474 |
| 2005/0161099 | A1 * | 7/2005 | Akema | B01J 19/0093 137/827 |
| 2007/0095407 | A1 * | 5/2007 | Chen | B01L 3/50273 137/597 |
| 2009/0044875 | A1 * | 2/2009 | Griss | B01L 3/50273 137/828 |
| 2010/0093559 | A1 * | 4/2010 | Fan | B01L 3/502738 506/9 |
| 2010/0120130 | A1 * | 5/2010 | Srinivasan | B01F 13/0071 435/283.1 |
| 2010/0163414 | A1 * | 7/2010 | Gillies | B01L 3/502715 204/547 |
| 2010/0236928 | A1 * | 9/2010 | Srinivasan | B01L 3/502761 204/450 |
| 2010/0282609 | A1 * | 11/2010 | Pollack | B01L 3/5027 204/450 |
| 2011/0108422 | A1 * | 5/2011 | Heller | G01N 27/447 204/547 |
| 2011/0247934 | A1 * | 10/2011 | Wang | B01L 3/502792 204/450 |
| 2013/0284956 | A1 * | 10/2013 | Kwon | F16K 99/0019 251/65 |
| 2014/0251807 | A1 * | 9/2014 | Shenderov | B01F 13/0071 204/450 |

* cited by examiner

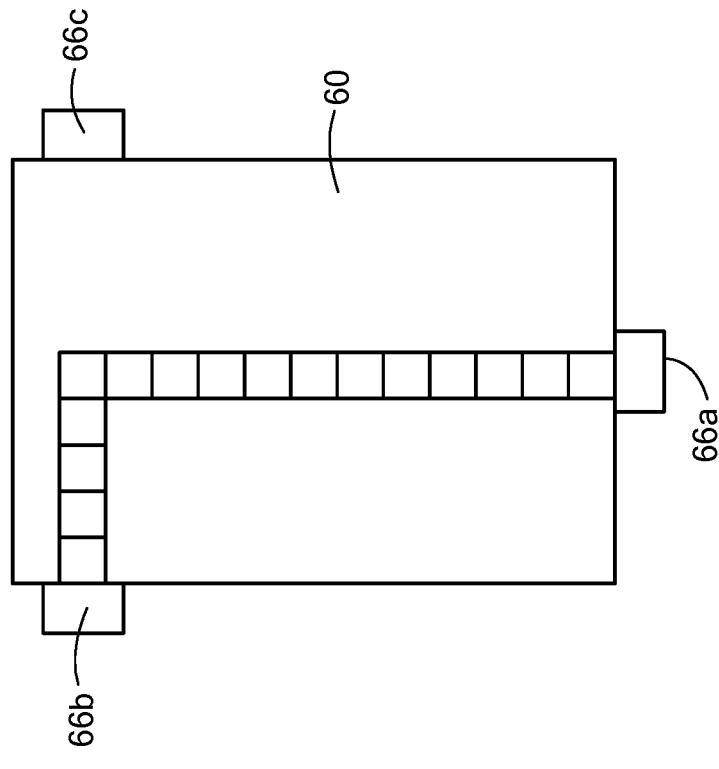
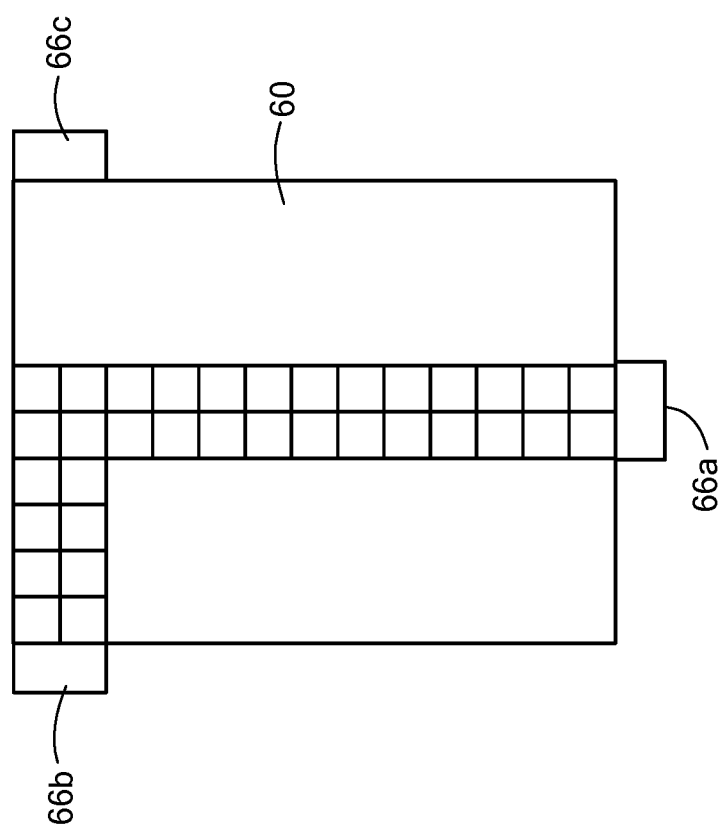

ELECTRORHEOLOGICAL VALVE

CROSS-REFERENCE TO RELATED APPLICATION

This application is a continuation of U.S. patent application Ser. No. 14/618,670, filed Feb. 10, 2015 which is a continuation of U.S. patent application Ser. No. 13/066,909, filed Apr. 27, 2011, both of which are hereby incorporated by reference in its entirety, and to which this application claims priority.

GOVERNMENT RIGHTS

This invention was made with U.S. Government support under Contract No. W911NF-08-C-0055 awarded by DARPA through the Army Research Office. The Government has certain rights in the invention.

FIELD OF THE INVENTION

The subject invention relates to field responsive fluid valves and manifolds including electrorheological fluid technologies.

BACKGROUND OF THE INVENTION

In a typical electrorheological (ER) fluid valve, two closely spaced electrodes establish an electrical field between them to stop the flow of the ER fluid through the valve as the ER fluid becomes highly viscous in the presence of the electrical field. Removing the electrical field between the two electrodes allows the ER fluid to flow again through the valve. Cylinder type and plate type ER valves are known. See Han, Y-M; Sung, K-G; Shohn, J. W.; and Choi, S-B, "Performance Comparison of Electrorheological Valves with Two Different Geometric Configurations: Cylinder and Plate", J. Mechanical Engineering Science, Proc. IMechE Vol. 223 Part C: pages 573-581 incorporated herein by this reference. See also Zuan, Michael, "Design of Cylinder Drives Based on Electrorheological Fluids," International Journal of Fluid Power 7 (2006) No. 1, pp 7-13.

One advantage of using an ER valve as opposed to a traditional hydraulic valve lies in the simplicity of the valve. Two electrodes with a gap between them and the application of a voltage across the electrodes is required as opposed to moving parts associated with servo valves. An ER valve can also be made very small. Additionally, the ER effect can be made to occur quickly, within ten milliseconds resulting in fast response times and high frequency operation.

A typical ER fluid valve can be either fully open or fully closed. In order to control the flow rate through an ER valve, pulse width modulation of the electrical field in the valve can be used or variable voltages can be applied to the electrodes. A variable voltage can be used, but can be difficult to generate, especially in small-scale systems.

Traditional servo valves can increase the weight of a system, are expensive, and can include high precision components. On the other hand, controlling the flow rate of fluid through an ER valve can be challenging.

SUMMARY OF THE INVENTION

One aspect of the invention, in one preferred embodiment, is to provide a new ER valve which is configured to control the flow rate through the valve without the need for variable voltages and to provide a new ER fluid manifold as an alternative to a servo valve. The subject invention results from the realization, at least in part, that one preferred embodiment of a variable flow rate ER fluid valve is effected by defining multiple flow passages through a valve housing each with its own independently controllable electrode (or electrode set) so all the flow passages can be open or closed or select flow passages can be open while select flow passages can be closed.

The subject invention, however, in other embodiments, need not achieve all these objectives and the claims hereof should not be limited to structures or methods capable of achieving these objectives.

The invention features an ER fluid valve comprising a housing and a plurality of parallel flow passages through the housing each defined by spaced electrodes at least one of which is controllable independently of other flow passage electrodes. A controller is configured to selectively establish fields for all of the independently controllable electrodes to a) close all of the flow passages to ER fluid flowing through the housing, to b) remove the fields from all of the independently controllable electrodes to open all the flow passages to the ER fluid flowing through the housing, and to c) establish fields for select independently controllable electrodes to close their associated flow passages for restricted flow of the ER fluid through the housing.

In some versions, all the flow passages share one continuous electrode. In one such example, the independently controllable electrodes of each flow passage are lengthy conductive members (e.g., traces) separated from adjacent conductive members by an insulator and closely spaced with respect to the continuous electrode. In another example, the independently controllable electrodes are arranged in a grid and spaced from the continuous electrode. In this version, the housing can include multiple ports (e.g., four or more) and the controller is then configured to energize electrodes in the grid between select ports. Typically, each grid electrode includes a conductive member surrounded by an insulator. For these and other examples, the flow passages may be in the same plane. But, in still other examples, the flow passages are in different planes. One such example includes flow passages stacked radially. In still other versions, the independently controllable electrodes are rectangular, square or irregularly shaped.

The controller can be configured to selectively apply a voltage to the independently controllable electrodes while the electrode spaced therefrom remains grounded. Alternatively, the controller can be configured to selectively ground the independently controllable electrodes.

One ER fluid valve in accordance with the invention features a first substrate including spaced individually controllable electrodes defining multiple flow passages for the ER fluid, the flow characteristics of which are altered by an electrical field. Another electrode is spaced from the first substrate for establishing multiple electrical fields with the individually controllable electrodes to open and close select flow passages. The spaced individually controllable electrodes and flow passages may extend continuously along the first substrate which is typically made of an insulated material (and wherein the individually controllable electrodes are spaced conductive traces on the insulated material). Or, the electrodes in each flow passage can include multiple grid electrodes.

A flow manifold in accordance with the invention includes a housing including a plurality of ports, a first substrate associated with the housing including a plurality of independently controllable electrodes defining multiple flow passages between the plurality of ports which can be selectively opened and closed, and a second substrate associated with the housing including at least another electrode spaced from the independently controllable electrodes. Typically, a controller is configured to selectively control the independently controllable electrodes to established electrical fields blocking select flow passages since the ER fluid becomes highly viscous in the presence of the electrical fields.

The invention also features a method comprising defining a plurality of flow passages via multiple spaced electrodes at least one of which for each flow passage is controllable independently of other flow passage electrodes. All the flow passages are closed to ER fluid flowing through a housing by establishing an electrical field for all of the independently controllable electrodes. All of the flow passages are closed to ER fluid flowing through the housing by removing the electrical field from all of the independently controllable electrodes. The flow of ER fluid thought the housing is restricted by establishing electrical fields for select independently controllable electrodes to close their associated flow passages when the ER fluid in those flow passages is rendered highly viscous.

One method in accordance with the invention features providing on a first substrate a plurality of independently controllable electrodes defining multiple flow paths between a plurality of ports which can be selectively opened and closed, including at least another electrode spaced from the independently controllable electrodes, and associating the first and second substrates with a housing configured to include the plurality of ports. By selectively controlling the independently controllable electrodes to block select flow passages in the housing, the method selectively opens and closes select ports of the housing.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 9A is a schematic top view showing an example of a manifold with a flow passage therethrough defined by grid electrodes;

FIG. 9B is a schematic top view of the manifold shown in FIG. 9A except now the flow rate for the flow passage shown in FIG. 9A is reduced;

DETAILED DESCRIPTION OF THE INVENTION

Figure 1:
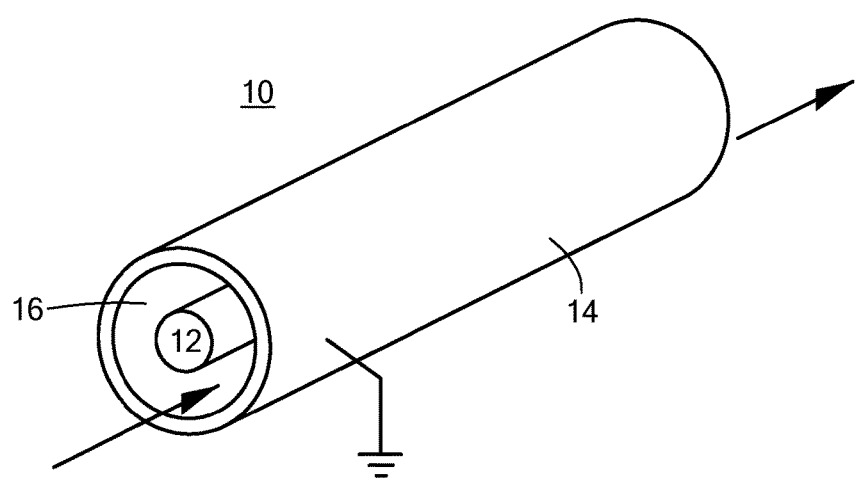
FIG. 1 is a schematic three dimensional end view of a prior art cylinder type ER valve.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
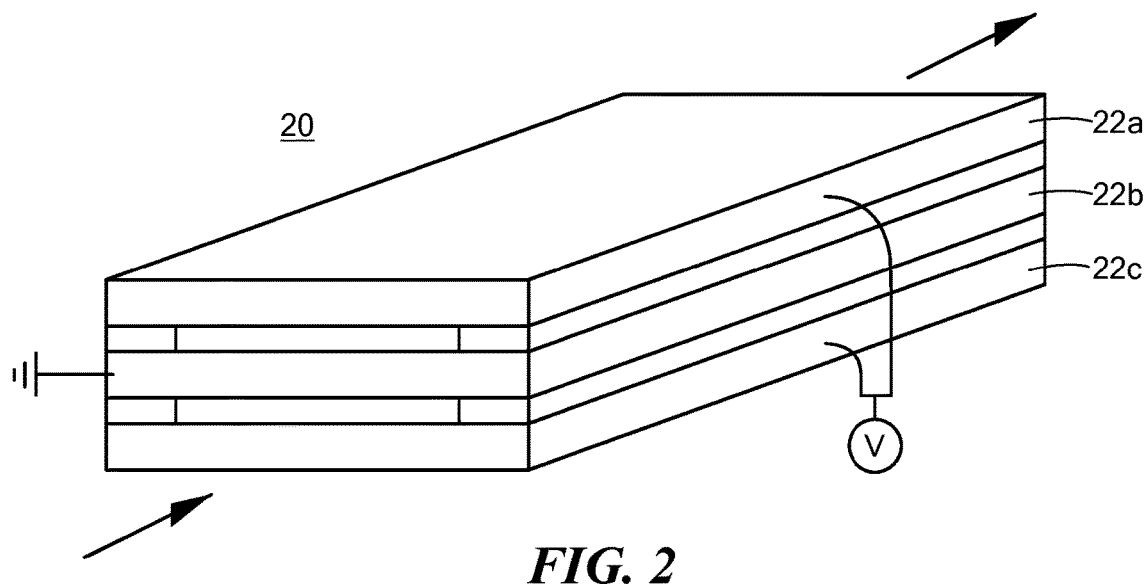
FIG. 2 is a schematic three dimensional end view of a prior art plate type ER valve.

FIG. 1 shows a prior art cylinder type ER valve 10 with inner electrode 12 and outer electrode 14. An electrical field established between electrodes 10 and 12 increases the viscosity of an ER fluid flowing in annular space 16 between the electrodes and stops the flow. Removing the electrical field allows the ER fluid to flow again. FIG. 2 shows a prior art plate type ER valve 20 with electrodes 22a, 22b, and 22c separated by insulators as shown. Plate 22b is connected to ground and plates 22a and 22c are connected together to a common voltage source. When the voltage source is switched on, ER fluid will not flow between the plates. When no voltage is applied to plates 22a and 22c, the ER fluid will flow. As noted in the Background section above, controlling the flow rate through the prior art ER valves can be problematic in some instances.

Figure 3:
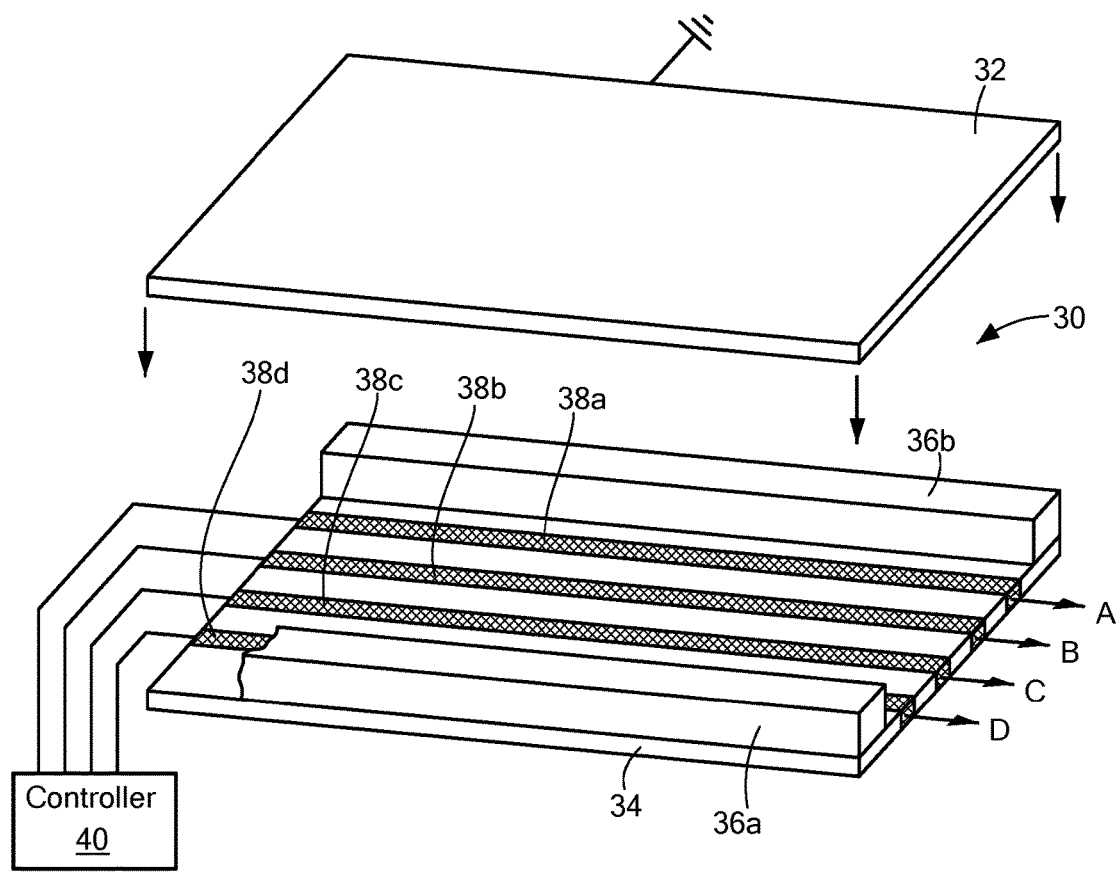
FIG. 3 is a schematic three dimensional exploded view showing the primary components associated with one embodiment of a new ER valve in accordance with an example of the subject invention.

FIG. 3 shows an example of a new ER fluid valve 30 with a housing defined by electrode 32, substrate 34 (typically printed circuit board material), and spacers/walls 36a and 36b. A plurality of parallel flow passages through the housing such as passages A, B, C, and D (typically there are 10-20 or more flow passages) are established between the input port and the output port. Each flow passage is defined by spaced electrodes of at least one of which is controllable independently of the other flow passage electrodes. That is, flow passage A is defined by electrode 38a on substrate 34 (e.g., a conductive trace) and electrode 32; flow passage B is defined by electrode 38b on substrate 34 and electrode 32; and flow passage C is defined by electrode 38c on substrate 34 and electrode 32. Each lengthy conductive trace member 38 in this example is spaced from its neighbors and insulated therefrom via the material of printed circuit board 34.

Controller 40 is configured to selectively establish an electrical field for all of the independently controllable electrodes 38a-38d to close all of the flow passages to ER fluid through the housing defined by substrate 34, continuous top electrode 32, and spacers 36a and 36b. Controller 40 can also selectively remove the electrical field from all of the independently controllable electrodes 38a-38d to open all the flow passages A-D through the housing. Controller 40 is also configured to establish electrical fields for select independently controllable electrodes 38a-38d to close their associated flow passages (A, B, C and/or D) for restricted flow of ER fluid through the housing.

Figure 4A:
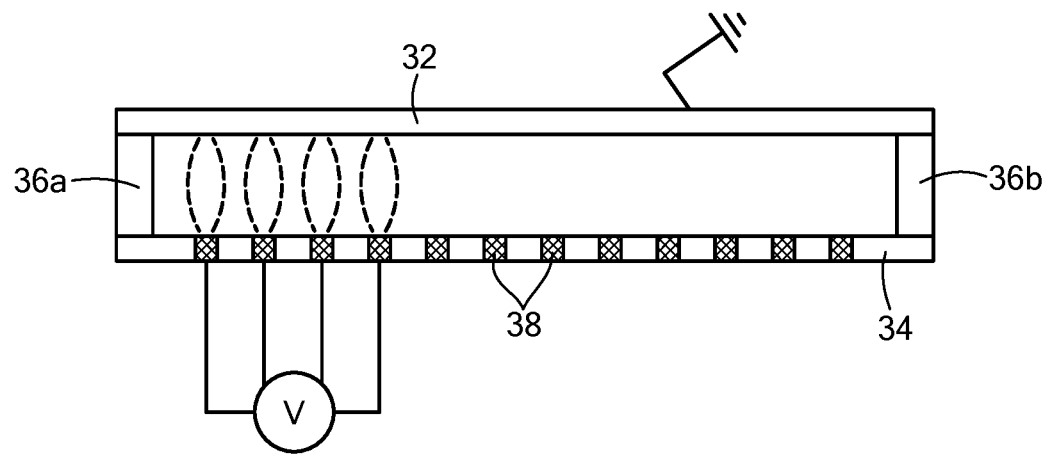
FIG. 4A is a schematic end view showing the ER valve of FIG. 3 with a voltage applied to approximately half of the valve electrodes resulting in one flow rate through the valve.
Figure 4B:
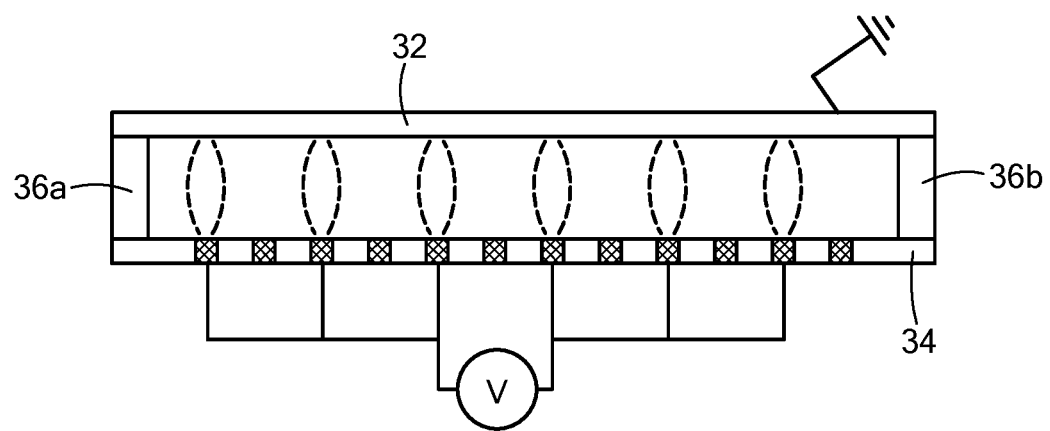
FIG. 4B is a schematic end view of the valve show in FIG. 3 again with a voltage applied to approximately half of the electrodes but now resulting in a different flow rate than the configuration shown in FIG. 4A.

Thus, if no voltage is applied to any electrode, the valve is fully open and low viscous ER fluid flows along flow passages A-D. If a voltage is applied to all electrodes 38a-38b with electrode 32 grounded, the valve is fully closed since the ER fluid in each flow passage A-D is highly viscous in the presence of the electrical fields. The flow rate of the ER fluid through the valve is controlled by applying a high voltage to only select electrodes as shown in the examples of FIGS. 4A and 4B. In FIG. 4A, all of the electrodes on one side of the valve are energized resulting in one flow rate and in FIG. 4B, again, about one half of the total electrodes are energized by energizing every other electrode but the result is a lower flow rate then was the case with FIG. 4A. In other examples, only electrode 38a, FIG. 3 has a voltage applied thereto and thus flow passage A is blocked by the high viscosity ER fluid in flow passage A but flow passages B and C remain open to low viscosity ER fluid flowing through the housing. This way, flow passages A, B, and C can be selectively opened and closed (e.g., A open, B and C closed; A and B open, C closed; A and C open, B closed; and the like) resulting in variable flow rates through the valve. In FIGS. 4A and 4B, the electrical fields shown may all have approximately the same strength.

Figure 5:
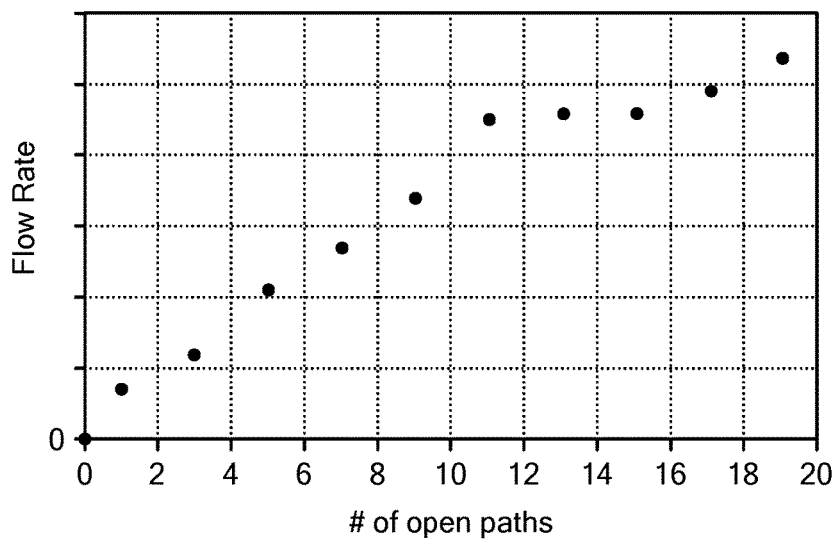
FIG. 5 is a graph of flow rate as a function of a number of open flow passages for an example of an ER valve in accordance with the invention.

FIG. 5 depicts how the flow rate through the valve is a function of the number of "open" flow passages (i.e., flow passages whose spaced electrodes do not have an electric field applied to them). As noted above in respect to FIGS. 4A and 4B, the flow rate is a function not only of how many flow passages are open but also how close the open flow passages are to each other.

Figure 6:
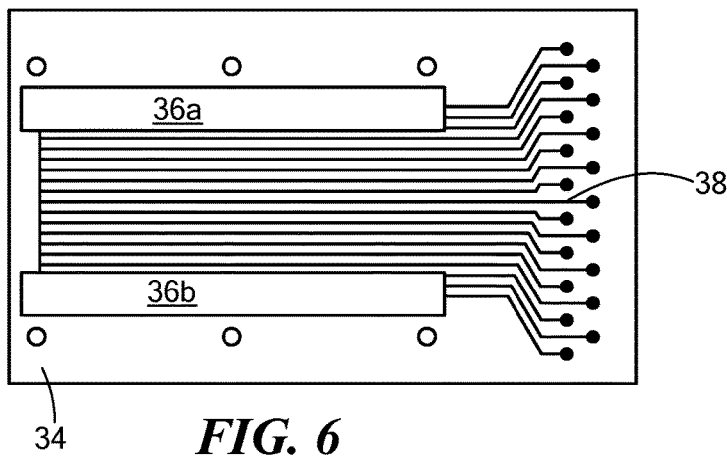
FIG. 6 is a schematic three dimensional top view showing a prototype ER valve in accordance with the invention.

FIG. 6 depicts a prototype ER valve with 19 flow passages. Substrate 34 is shown as are spacers/walls 36a and 36b. Conductive traces 38 can also be seen. The cover of the valve would typically be a conductive electrode as shown in FIG. 3. Various technologies can be used to fabricate this valve including printed circuit board methodologies, MEMS technology (see U.S. Pat. No. 5,640,995 incorporated herein by this reference), and the like. The new ER valves can be used to control an actuator as shown in U.S. Pat. No. 5,099,884 incorporated herein by this reference, to control spool valves, to provide mechanical forces, and the like.

Figure 7:
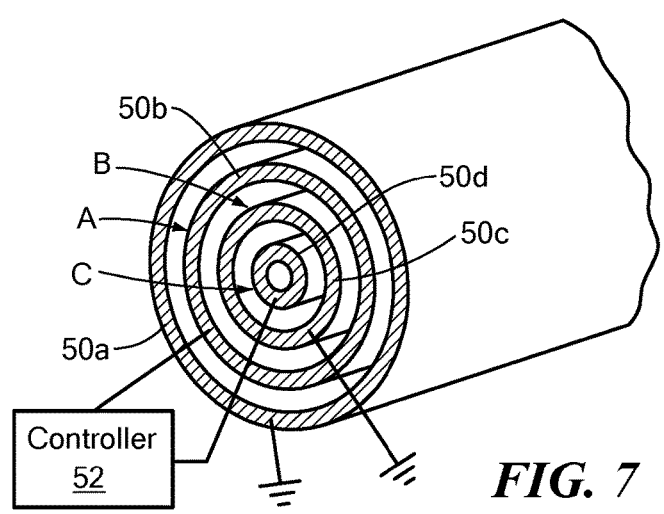
FIG. 7 is a schematic three dimensional end view showing another embodiment of a new ER valve in accordance with the invention.

So far, the independently controllable electrodes 38 all lie in the plane of substrate 34. But, they may lie in different planes in a fashion similar to prior art plate type electrodes. In FIG. 7, the flow passages are stacked radially. Flow passage A is defined by electrodes 50a and 50b, parallel flow passage B is defined by electrodes 50b and 50c, and parallel flow passage C is defined by electrodes 50c and 50d. Electrodes 50a and 50c may be connected to ground and controller 52 is configured to selectively apply a high voltage to electrodes 50b and/or 50d. If, for example, a high voltage is applied to both electrodes 50b and 50d, no flow occurs and the valve is closed. If a high voltage is applied to neither electrode 50b nor 50d, then flow is not restricted by any electrical field and the valve is fully open. If a high voltage is applied to electrode 50b but not electrode 50d, or vice versa, then the flow through the valve is only partially restricted. That is, for a high voltage applied only to electrode 50d, then flow passages A and B are open but flow passage C is closed.

Figure 8A:
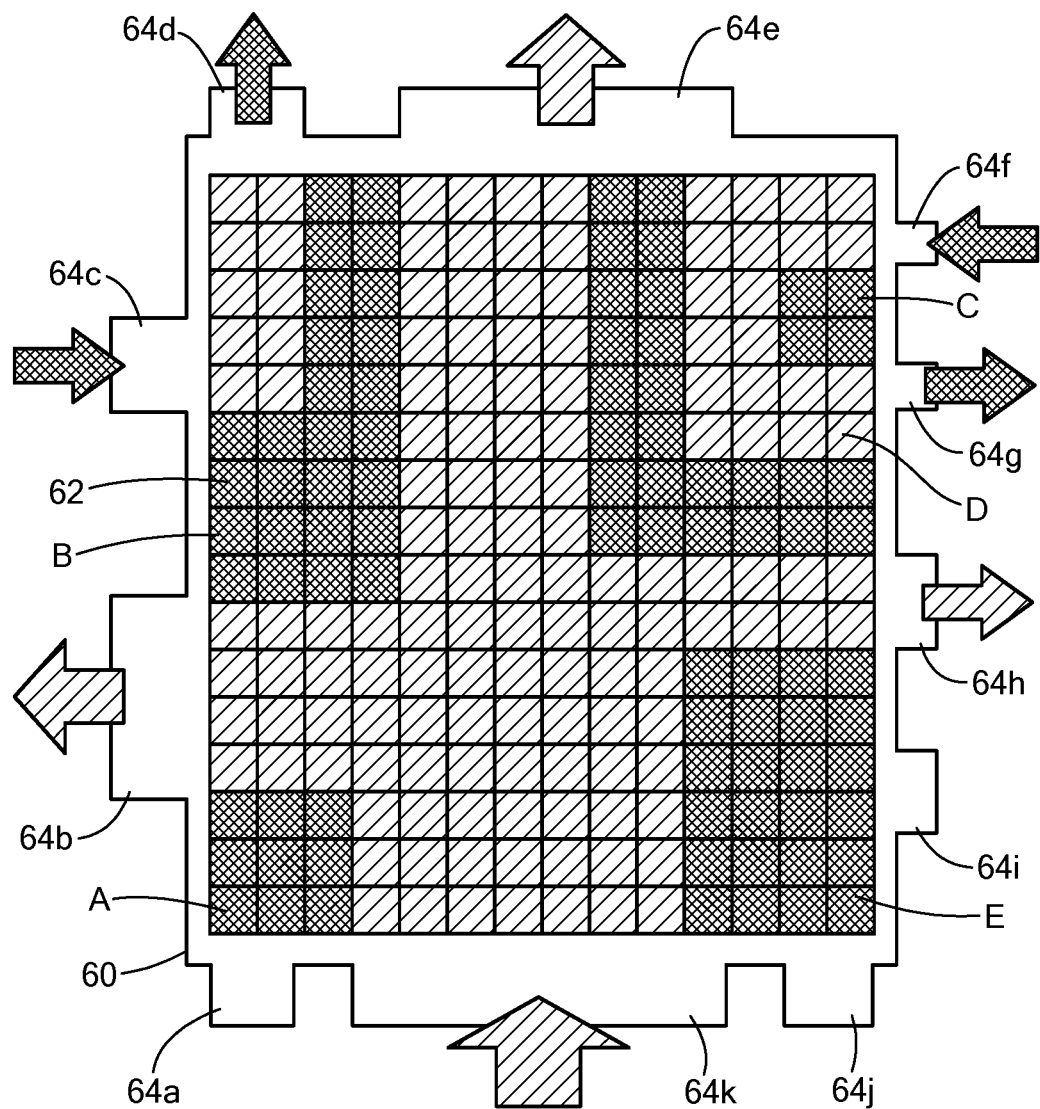
FIG. 8A is a schematic top view showing an example of a valve manifold with electrodes in a grid-like pattern in accordance with still another example of the subject invention.
Figure 8B:
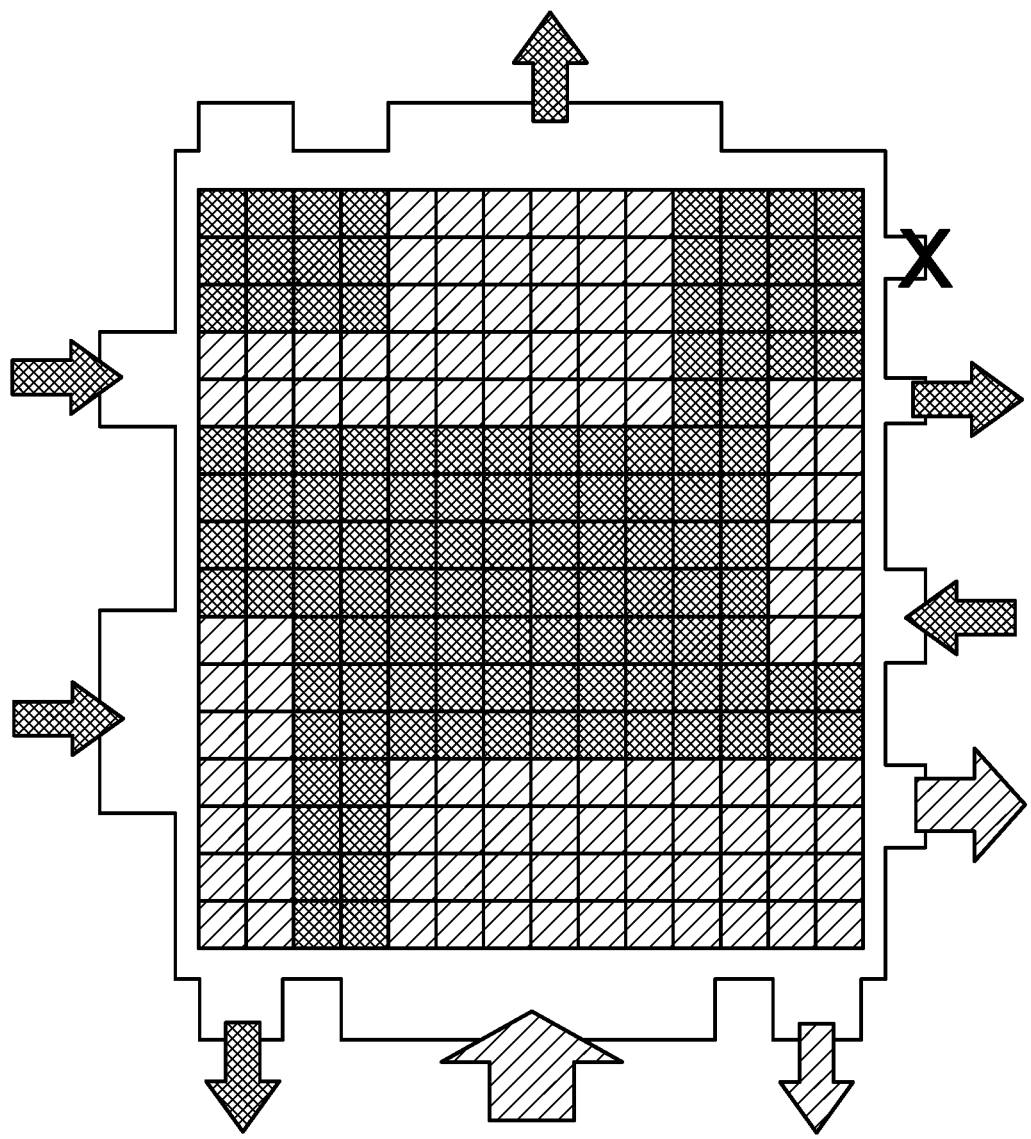
FIG. 8B is a schematic view showing several different flow paths obtainable for the manifold of FIG. 8A.

FIGS. 8A-8B depict a manifold design wherein both the flow rate and flow direction can be selected. Here, substrate 60 includes grid electrodes 62 each, for example, comprising a square conductive land on a printed circuit board closely spaced to its neighboring electrodes. This manifold defines ports 64a-64k when a top electrode is closely spaced from substrate 60 (and using peripheral spacer/wall structures, not shown). The flow paths between the ports can be varied by selectively applying a voltage (or ground) to groups of grid electrodes. In FIG. 8A, electrode groups A, B, C, D, and E have a voltage applied to them which defines parallel flow passages connecting port 64k with ports 64b, 64e, and 64h; connecting port 64c to port 64d; and connecting port 64f to port 64g.

In FIG. 8B, different grid electrodes are energized resulting in different flow passage configurations. Thus, one of the two electrodes in the system is divided into a grid-like pattern and each grid electrode is independently controllable or, alternatively, groups of grid electrodes can be independently controlled. Such a valve can have multiple inputs and outputs rendering it a manifold. The pattern of activation of the grid electrodes can form variable width passages between the inputs and outputs and connect different inputs and outputs at different times. In essence, the valve becomes an on the fly programmable reconfigurable manifold. Such a valve will perform adequately with either the ground side or the high voltage side patterned as shown in the figures although patterning the ground electrode to include the grid electrodes appears to be preferable. In one example, the legs of a mobile walking robot can be controlled by such a manifold. The result is independently controllable electrodes defining multiple flow paths between a plurality of ports which can be selectively opened and closed.

The flow rate can be varied as between two ports by controlling how many grid electrodes in the flow path are left deenergized. For example, in FIG. 9A, the flow passages between ports 66a and 66b are two grid electrodes wide (all the other grid electrodes on substrate 60 having a high voltage applied to them) while in FIG. 9B flow path A is only one grid electrode wide.

Figure 10:
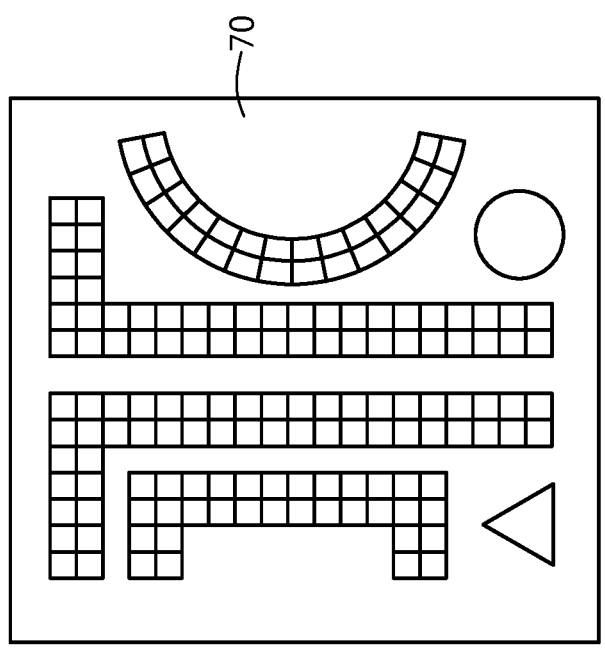
FIG. 10 is a schematic top view showing an example of an ER valve/manifold with uniquely shaped electrodes.

FIG. 10 shows how substrate 70 can include irregularly shaped electrodes to meet the requirements of a valve or manifold as desired.

Figure 11:
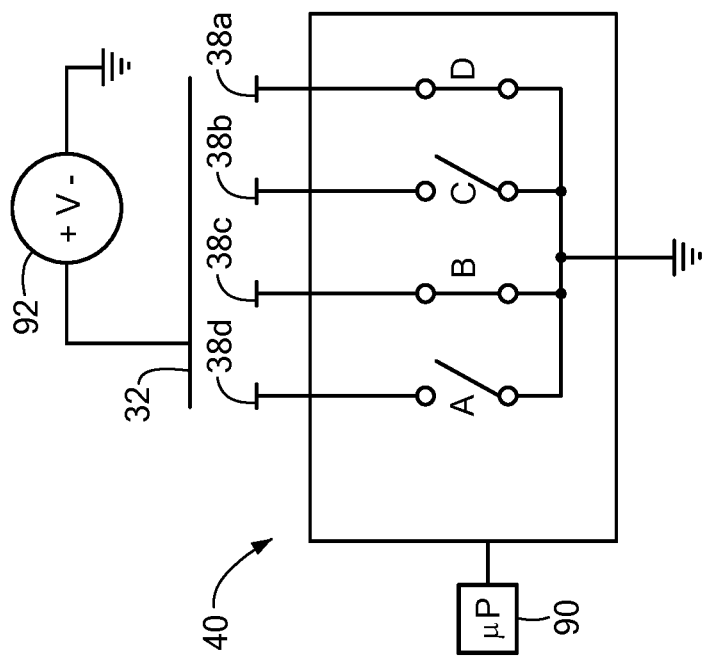
FIG. 11 is a diagram of an example of the controller shown in FIG. 3.

FIG. 11 depicts an example of the primary circuitry for controller 40, FIG. 3. Microprocessor 90 controls switches A, B, C, and D (relays or high voltage transistors) which selectively connect electrodes 38a-38d (see FIG. 3) to ground. Voltage source 92 is connected to continuous plate electrode 32 (in this example).

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An electrorheological fluid valve comprising:
   at least three fluid ports;
   a housing configured to enable an electrorheological fluid to flow between each fluid port;
   a grid of electrodes on at least one substrate of the housing; and
   a controller configured to selectively establish an electric field for at least one electrode in the grid,
   wherein the electric field causes a restriction in the flow of the electrorheological fluid between each fluid port, and wherein the controller is configured to:
      control each electrode in the grid independently from the other electrodes in the grid;
      selectively establish an electric field for a group of the electrodes in the grid in order to define a flow passage fluidly connecting a first one of the fluid ports to a second one of the fluid ports; and
      adjust a number of the electrodes in the group of the electrodes in the grid having established electric fields in order to vary a flow rate of the electrorheological fluid between the first one of the fluid ports and the second one of the fluid ports.

2. The valve of claim 1, wherein the controller is further configured to selectively establish an electric field for at least one electrode in the grid in order to fluidly disconnect at least one fluid port from at least one other fluid port.

3. The valve of claim 1, wherein the controller is further configured to selectively establish an electric field for at least one electrode in the grid in order to partially restrict the electrorheological fluid flow between at least two of the fluid ports.

4. The valve of claim 1, wherein adjusting the number of the electrodes in the group of the electrodes in the grid having established electric fields in order to vary the flow rate of the electrorheological fluid between the first one of the fluid ports and the second one of the fluid ports comprises:
   increasing the number of the electrodes in the group of the electrodes in the grid having established electric fields in order to decrease the flow rate of the electrorheological fluid between the first one of the fluid ports and the second one of the fluid ports; and
   decreasing the number of the electrodes in the group of the electrodes in the grid having established electric fields in order to increase the flow rate of the electrorheological fluid between the first one of the fluid ports and the second one of the fluid ports.

5. The valve of claim 4, wherein increasing the number of the electrodes in the group of the electrodes in the grid having established electric fields reduces a width of the flow passage fluidly connecting the first one of the fluid ports to the second one of the fluid ports.

6. The valve of claim 4, wherein decreasing the number of the electrodes in the group of the electrodes in the grid having established electric fields increases a width of the flow passage fluidly connecting the first one of the fluid ports to the second one of the fluid ports.

7. The valve of claim 1, wherein each electrode in the grid includes a conductive member surrounded by an insulator.

8. The valve of claim 1, further comprising flow passages defined between the fluid ports, the flow passages being in a same plane.

9. The valve of claim 1, wherein each electrode in the grid of electrodes is rectangular, square, or irregularly shaped.

10. The valve of claim 1, wherein the controller is configured to selectively apply a voltage to at least one electrode in the grid while the electrodes spaced therefrom remain grounded.

11. The valve of claim 1, wherein the controller is configured to selectively ground each electrode in the grid of electrodes.

12. A method of operating a valve comprising:
   providing a housing having at least three fluid ports;
   defining a flow passage fluidly connecting a first one of the fluid ports to a second one of the fluid ports based on establishing an electrical field for a group of the electrodes in the grid; and
   adjusting a number of the electrodes in the group of electrodes in the grid having established electrical fields in order to vary a flow rate of electrorheological fluid between the first one of the fluid ports and the second one of the fluid ports.

13. The method of claim 12, further comprising defining multiple flow passages between the fluid ports based on establishing electrical fields between various electrodes of the grid of electrodes.

14. The method of claim 13, wherein the multiple flow passages are reconfigurable.

15. The method of claim 12, wherein adjusting the number of the electrodes in the group of the electrodes in the grid having established electrical fields in order to vary the flow rate of the electrorheological fluid between the first one of the fluid ports and the second one of the fluid ports comprises:
   increasing the number of the electrodes in the group of the electrodes in the grid having established electrical fields in order to decrease the flow rate of the electrorheological fluid between the first one of the fluid ports and the second one of the fluid ports; and
   decreasing the number of the electrodes in the group of the electrodes in the grid having established electrical fields in order to increase the flow rate of the electrorheological fluid between the first one of the fluid ports and the second one of the fluid ports.

16. An electrorheological fluid valve comprising:
   at least three fluid ports;
   a housing configured to enable an electrorheological fluid to flow between each fluid port;
   a grid of electrodes; and
   a controller configured to:
      selectively establish an electric field for a group of the electrodes in the grid in order to define a flow passage fluidly connecting a first one of the fluid ports to a second one of the fluid ports; and
      adjust a number of the electrodes in the group of the electrodes in the grid having established electric fields in order to vary a flow rate of the electrorheological fluid between the first one of the fluid ports and the second one of the fluid ports.

17. The electrorheological fluid valve of claim 16, wherein the controller is further configured to selectively define multiple flow passages between the fluid ports based on establishing electrical fields between various electrodes of the grid of electrodes.

18. The electrorheological fluid valve of claim 17, wherein the controller is further configured to reconfigure the multiple flow passages.

19. The electrorheological fluid valve of claim 16, wherein the electrodes are rectangular, square, or irregularly shaped.

* * * * *